United States Patent
Zhang et al.

(10) Patent No.: US 10,103,365 B2
(45) Date of Patent: Oct. 16, 2018

(54) BATTERY PACK

(71) Applicant: CHERVON INTELLECTUAL PROPERTY LIMITED, Road Town (VG)

(72) Inventors: Yuexiang Zhang, Nanjing (CN); Xiaohong Lin, Nanjing (CN); Tianshi Yuan, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 237 days.

(21) Appl. No.: 14/583,320

(22) Filed: Dec. 26, 2014

(65) Prior Publication Data
US 2015/0188101 A1    Jul. 2, 2015

(30) Foreign Application Priority Data

Dec. 31, 2013  (CN) .......................... 2013 1 0752428
Sep. 30, 2014  (CN) .......................... 2014 1 0521184
Sep. 30, 2014  (CN) .......................... 2014 1 0523288

(51) Int. Cl.
*H01M 2/10*     (2006.01)
*H01M 2/30*     (2006.01)

(52) U.S. Cl.
CPC .......... *H01M 2/105* (2013.01); *H01M 2/1055* (2013.01); *H01M 2/30* (2013.01); *H01M 2220/30* (2013.01)

(58) Field of Classification Search
CPC .......... H01M 2002/0205; H01M 2/105; H01M 2/30; H01M 2/1055
See application file for complete search history.

(56) References Cited

U.S. PATENT DOCUMENTS

| | | | |
|---|---|---|---|
| 9,184,426 B2 * | 11/2015 | Yasui ................... | H01M 2/105 |
| 2003/0047364 A1 * | 3/2003 | Lipman ................ | H01M 2/1083 180/68.1 |
| 2006/0216580 A1 * | 9/2006 | Schlosser ............ | B60L 11/1822 429/97 |
| 2014/0255748 A1 * | 9/2014 | Jan ........................ | H01M 2/202 429/120 |

* cited by examiner

*Primary Examiner* — Stephen J Yanchuk
(74) *Attorney, Agent, or Firm* — Greenberg Traurig, LLP (57) ABSTRACT

A battery pack provides a high voltage output. The battery pack includes a battery housing, and a battery cell assembly arranged inside the battery housing. The battery cell assembly comprises a trapezoid portion having a plurality of battery cells arranged in parallel, wherein the trapezoid portions defines a trapezoid formed by the connection of the reference points of the cross sections of the battery cells successively.

17 Claims, 11 Drawing Sheets

BATTERY PACK

CROSS REFERENCE TO RELATED APPLICATION

This application claims priority from Chinese Application Serial CN201310752428.7, filed on Dec. 31, 2013, Chinese Application Serial No. CN201410521184.6, filed on Sep. 30, 2014, and Chinese Application Serial No. CN201410523288.0, filed on Sep. 30, 2014, each of which is incorporated herein by reference in their entirety.

FIELD OF THE DISCLOSURE

The present disclosure generally relates to a battery pack.

BACKGROUND OF THE DISCLOSURE

Battery packs, as a power source of a wireless electric tool, are generally one of the limiting factors influencing the current development of wireless electric tools. For instance, modern, known battery packs only have an output voltage below 30V, and can cause problems such as insufficient power and undesirable endurance upon driving large-power electric tools.

For example, at present, there is not a known battery pack that has an output voltage of more than 30V including a demonstrated safe and reasonable structure. Furthermore, there are no known chargers and/or electric tools that can utilize a battery pack around a 30V rating. In additional, currently known battery packs generally generate a large amount of heat during both charging and discharging process, and as such, are potentially big safety risks.

The statements in this section merely provide background information related to the present disclosure and may not constitute prior art.

SUMMARY

In one aspect of the disclosure, a battery pack with an output voltage of at least 56V, the battery pack comprises a battery housing, a battery cell assembly arranged inside the battery housing, a circuit board electrically connected to the battery cell assembly, and a connection terminals mounted to the circuit board.

The battery cell assembly may comprise a trapezoid portion comprising a plurality of battery cells parallel arranged, the trapezoid portions defines at least one trapezoid formed by the connection of the centers of the cross sections of the battery cells successively.

The trapezoid may comprise a long baseline, a short baseline parallel to the long baseline, two sidelines connecting the long baseline and the short baseline respectively. The long baseline may be formed only by the connection of the centers of the cross sections of the adjacent battery cells. The short baseline may connect at least the centers of the cross sections of at least two or more battery cells. The sidelines may connect at least the centers of the cross sections of at least two or more battery cells.

In one aspect, the circuit board and the connection terminal may be formed as a whole at least partially arranged between two battery cells forming the long baseline.

In another aspect, the minimum distance between the connection terminal and external surface of the battery housing may be greater than or equal to 7 mm.

Further, the long baseline having the longest length in the trapezoid portion may be located on the edge of the battery cell assembly.

Further, the trapezoid portion may include only one trapezoid.

Further, the battery cell assembly may comprise two trapezoid portions, wherein the long baseline having the longest length in one of the trapezoid portions may be longer than the long baseline having the longest length in the other trapezoid portions.

Further, the short baselines of the two trapezoid portions may coincide in the same line.

Further, the battery cell may be a cylindrical lithium battery.

Further, all the trapezoids in the trapezoid portions may be isosceles trapezoids.

Particularly, the battery cells in the battery cell assembly may be arranged symmetrically with each other with respect to the symmetry axis of the isosceles trapezoid.

Further, the battery housing may define a first maximum projection plane, and the projected area of the battery housing in the first maximum projection plane may be larger than that in other planes.

The cross section of the battery cells may be perpendicular to the first maximum projection plane of the battery housing.

Further, the battery cell assembly may define a second maximum projection plane, and the projected area of the battery cell assembly in the second maximum projection plane being larger than that in other planes, the cross section of the battery cell being perpendicular to the second maximum projection plane of the battery cell assembly, the first maximum projection plane of the battery housing being parallel to the second maximum projection plane of the battery cell assembly.

Further, the battery housing may comprise: installation guide rails capable of guiding the battery pack to connect to a charger or an electric device at least along the first direction perpendicular to the cross section of the battery cell.

Further, two installation guide rails may be provided, and the connection terminal may be at least partially arranged between the two installation guide rails.

The battery housing may further define: a housing groove at least formed between two battery cells which form the long baseline by the connection of the centers of the cross sections thereof.

Further, two installation guide rails may be provided, and at least one housing groove may be arranged between the two installation guide rails.

Further, the connection terminal may be partially arranged inside the housing groove in a plane parallel to the cross section of the battery cell.

Further, the housing groove may be provided with a heat dissipation holes, the housing groove comprising a groove bottom surface parallel to the first direction on which the heat dissipation holes are arranged.

Further, the installation guide rails may be at least formed by a guiding groove extending along the first direction, the guiding groove being opened in the front along the first direction and closed in the rear thereof, the connection terminal being closer to the rear of the guiding groove in the first direction.

The battery housing may further comprise a stopping housing wall with at least part of the wall surface perpendicular to the first direction, the front of the housing groove having the largest width may be opened, and the stopping housing wall may be arranged in the rear of the housing groove, the connection terminal being arranged inside the stopping housing wall.

Further, at least one housing groove may be arranged between two installation guide rails symmetrically arranged with respect to the housing groove.

Further areas of applicability will become apparent from the description provided herein. It should be understood that the description and specific examples are intended for purposes of illustration only and are not intended to limit the scope of the present disclosure.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following disclosure of various examples is merely exemplary in nature and is in no way intended to limit the invention, its application, or uses.

Figure 1:
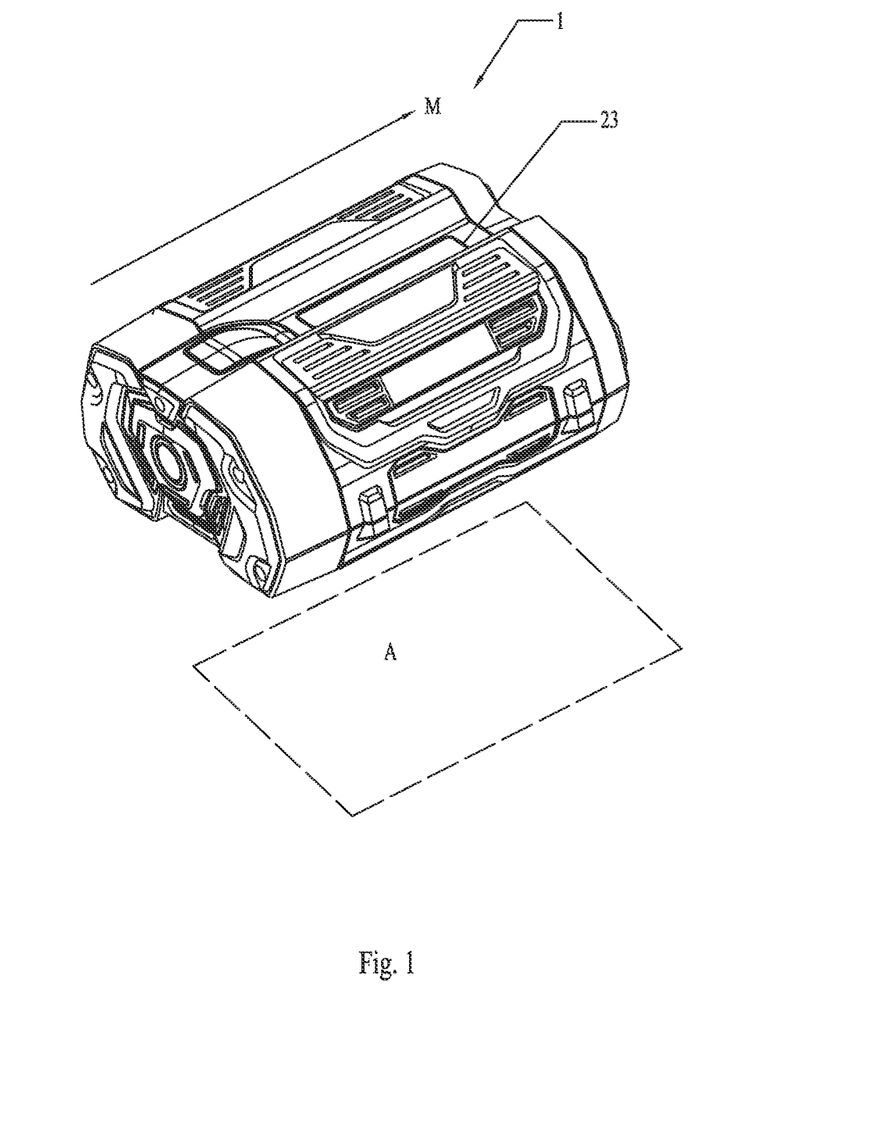
FIG. 1 is a schematic view illustrating the perspective structure of a battery pack according to the present disclosure.
Figure 2:
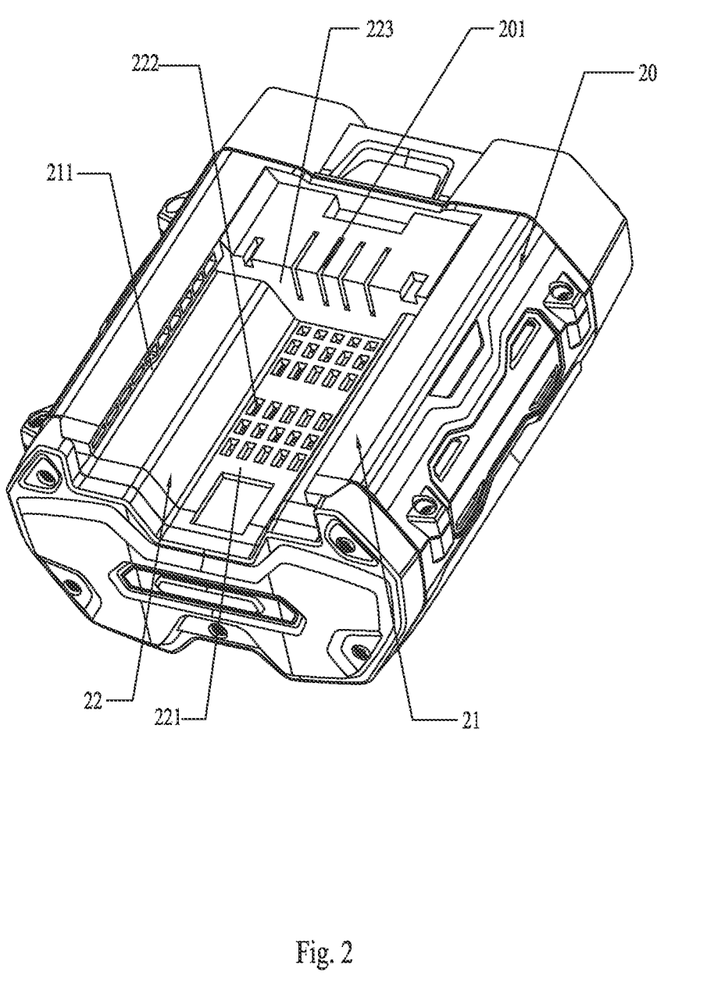
FIG. 2 is a schematic view illustrating the perspective structure of the battery pack of FIG. 1 in another direction.
Figure 3:
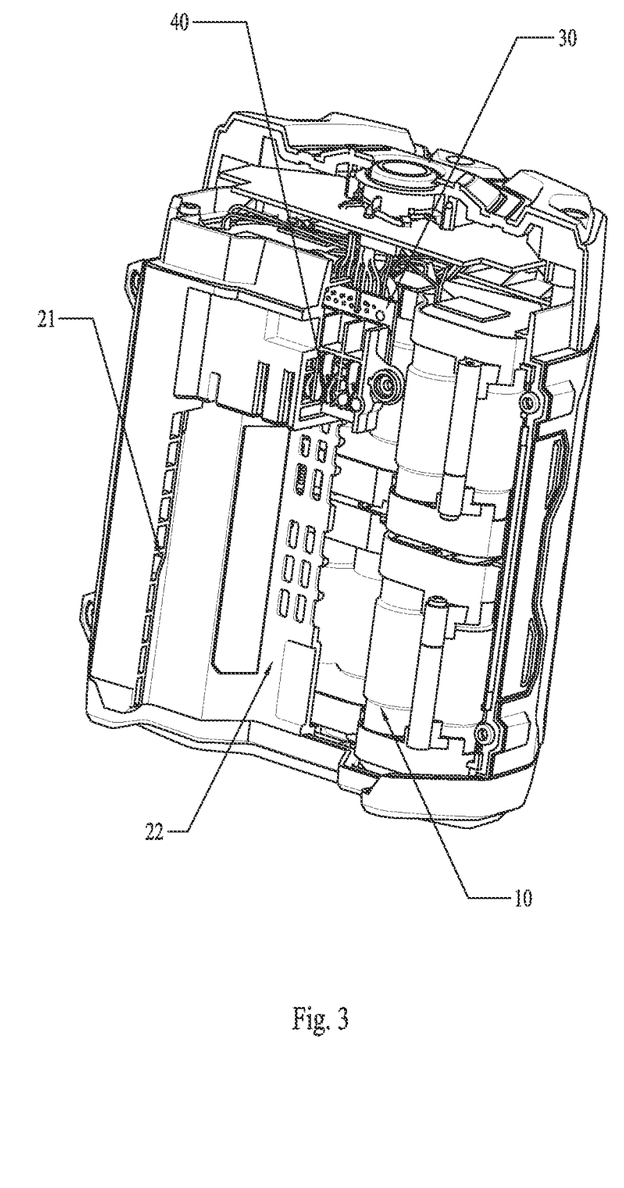
FIG. 3 is a schematic inside view of the battery pack of FIG. 1, wherein the battery housing of the battery pack is concealed.

Referring to FIGS. 1-3, a battery pack 1 comprises a battery cell assembly 10 and a battery housing 20.

The battery cell assembly 10 is the electric power container of the battery pack 1, storing or outputting electric power by the conversion of electric energy and chemical energy. As disclosed, the battery cell assembly 10 stores and outputs electric power by the conversion of electric energy and chemical energy of the lithium-containing compound.

The battery cell assembly 10 stores electric energy during charging, and provides the electric stored to an appliance when connected to an electric device, such as electric tool and etc.

The battery cell assembly 10 can be an integral electric power container. The term "integral" indicates the material to implement the conversion of electric energy and chemical energy is packaged in the same container.

Referring to FIG. 2, the battery cell assembly 10 in the battery pack 1 comprises a plurality of same containers with compound packaged inside, which can generate electric power. The container thereof is a battery cell 11. Each battery cell 11 can provide some electric energy, and has a positive pole and a negative pole for physical connection.

The battery cell 11 can be a cylindrical lithium battery according to FIG. 3, with a nominal voltage of 4V.

Figure 4:
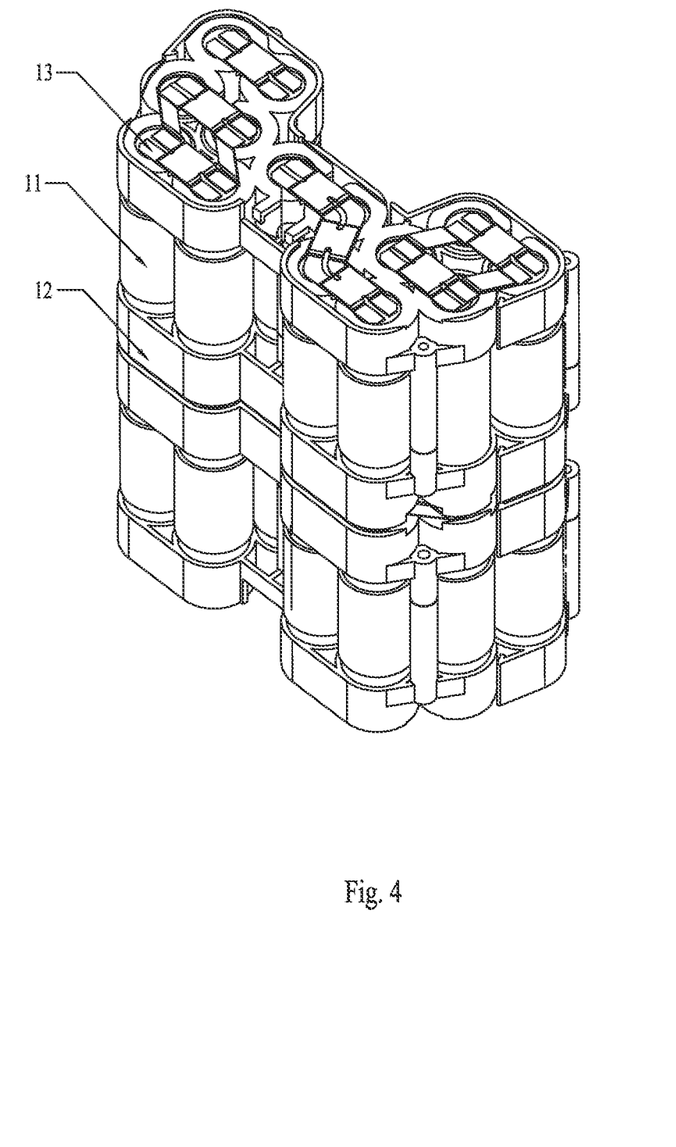
FIG. 4 is a schematic view illustrating the perspective structure of a battery cell assembly in the battery pack of FIG. 1.

According to FIG. 4, the example battery cells 11 are fixed with brackets 12, and are connected to each other battery cell 11 by a wiring assembly 13, to form the battery cell assembly 10 as a battery device with positive and negative terminals.

Referring to FIG. 3, the example battery housing 20 contains at least the battery cell assembly 10, the inner space thereof can contain the battery cells 11, the fixed bracket 12 and the wiring assembly 13. The accommodating space formed inside the battery housing 20 is a relatively closed space, to protect the structure inside and prevent users from easily touching any of the live parts of the battery cell assembly 10 directly.

Referring to FIG. 3, the battery pack 1 further comprises a circuit board 30 and a connection terminal 40.

The example circuit board 30 loads the control circuit and the control component correspondingly.

It should be pointed out that the number of the circuit board 30 can be configured according to the function of the specific battery pack 1. Additionally, the control component on the circuit board 30 typically generates heat while controlling.

The connection terminal 40 is generally made of conductive material, to physically connect the internal and the external parts of the battery pack 1 to transfer electric energy or signal.

As the connection terminal 40 is usually in a charged state, the example connection terminal 40 is completely arranged inside the battery housing 20 of the battery pack 1, the connection terminal 40 is mounted on the circuit board 30. The battery housing 20 has a terminal port 201, the terminal of a charger or an electric device can plug into the terminal port 201 to physically connect to the connection terminal 40, and transfer electric energy or signal by the properties of the conductive material.

It will be noted that when the output voltage of the battery pack 1 is greater, for example more than 50V, as the connection terminal 40 is the entity of the battery pack 1 to output voltage, the output voltage of the battery pack 1 is the voltage difference between the connection terminals 40 of the positive and the negative pole. It is typical for a certain distance to be maintained away from the connection terminal, under high voltage.

In the example of FIG. 1, the distance between the connection terminal 40 and the outside surface of the battery cell housing 20 can be configured increase the distance. In general, even if the user touches the surface of the battery cell housing 20 near the terminal port 201 accidentally, the battery cell housing 20 will stop the user from any further touching. Therefore, user safety can be increased if the distance between the connection terminal 40 and the outside surface of the battery cell housing 20 is properly configured.

After tested experiments, in one example, an output voltage in the range of 50V to 100V, the minimum distance between the connection terminal 40 and the outside surface of the battery housing 20 is greater than 7 mm.

Certainly, regarding for the size of the battery pack 1, the connection terminal 40 cannot be moved away from the outside surface of the battery housing 20 without limit. Thus, in one instance, the distance is approximately in the range of 7 mm to 10 mm.

For the battery pack 1, the voltage provided by each battery cell 11 is relatively fixed, and a considerable number of the battery cells 11 have to be contained in the battery cell assembly 10 to implement the battery pack 1 having an output voltage of more than 50V.

Suppose the battery pack 1 needs to output a voltage of 56V, each battery cell 11 can provide a voltage of 4 v, the battery cell assembly 10 needs at least 14 battery cells 11 in housing of all the battery cells are in series.

For larger electric energy capacity, the number of the battery cells 11 will be more than 14, in the embodiment according to FIG. 4, two battery cells 11 form an assembly in parallel, and 14 of such assembly connect in series, the battery cell assembly 10 has 28 battery cells. As the battery cell 11 provides heat during either charging or discharging, heat dissipation issues need to be considered in the arrangement of the battery cells 11.

If there is one single battery cell 11 without any other battery cells around, heat thereof will be dissipated promptly. But in the actual design, the battery pack 1 has a certain size, which is not enough for all the battery cells to be arranged repeatedly along the direction of their length. It is general to arrange some battery cells 11 aligned in the front and rear to form a structure, and arrange such structures repeatedly along the length direction of the battery cell 11 as required.

Figure 6:
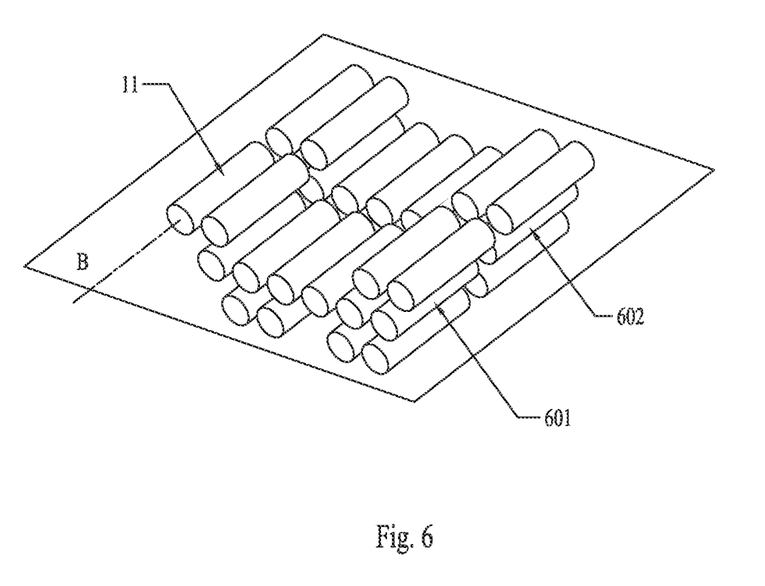
FIG. 6 is a schematic view illustrating the perspective structure of a battery cell assembly with 14 battery cells inside.
Figure 7:
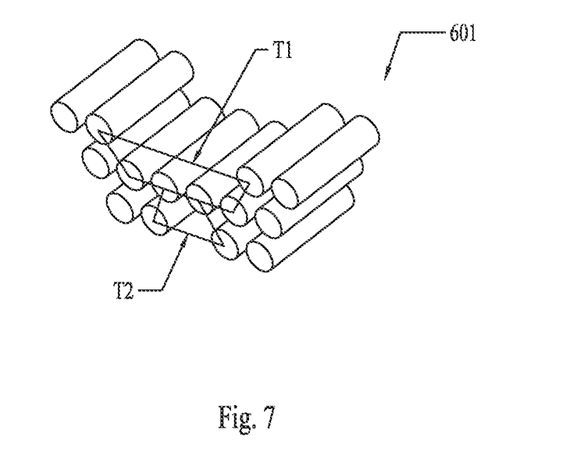
FIG. 7 is a schematic view illustrating the perspective structure of the battery cell assembly in FIG. 6.

Suppose the number of battery cells 11 is 14, the accepted design dimensions of the battery pack 1 along the direction parallel to the length of the battery cell 11 is greater than or equal to the length of two battery cells 11. Therefore, it can be implemented to arrange 7 battery cells 11 as a structure, and then arrange two such structures along the direction of the length. According to FIG. 6, 28 battery cells 11 are divided into two groups 601 and 602, and FIG. 7 is the group 601.

According to the design conception, other battery cells 11 are usually arranged around one battery cell 11.

Figure 10:
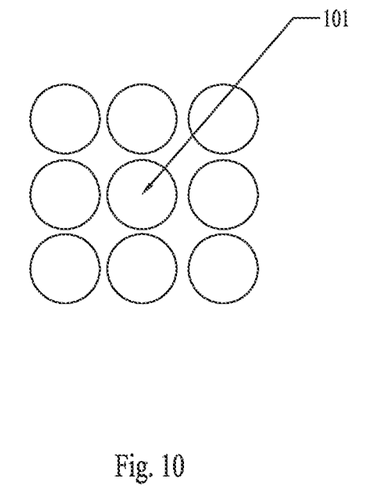
FIG. 10 is a schematic cross view of an existing arrangement of the battery cell assembly, wherein the battery cells are arranged aligned in above, below, left and right.

Referring to FIG. 10, if the battery cells 101 are arranged in order, when the number of the battery cells 101 is greater than 9, one of the battery cells 101 is completely surrounded by the others. It is difficult for the battery cell 101 to dissipate heat thereof, and it may accumulate heat.

Figure 11:
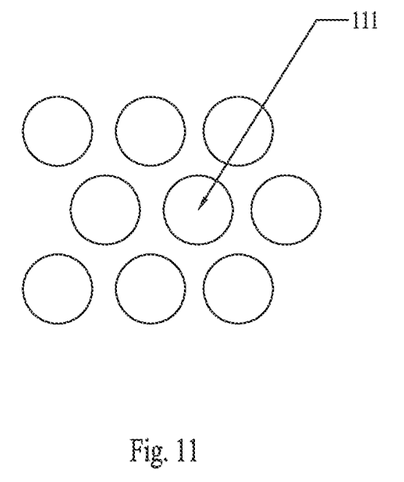
FIG. 11 is a schematic cross view of an existing arrangement of the battery cell assembly, wherein the battery cells are arranged aligned in left and right, but dislocated in above and below.
Figure 12:
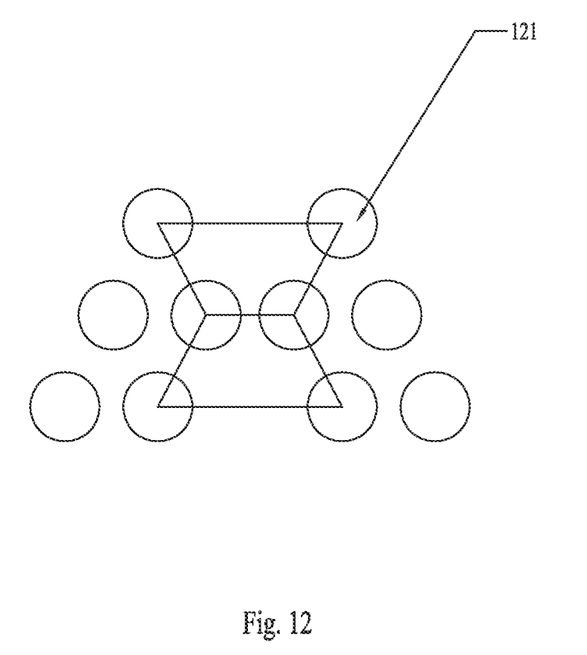
FIG. 12 is a schematic cross view of an arrangement of the battery cell assembly with 10 battery cells inside according to the present disclosure.
Figure 13:
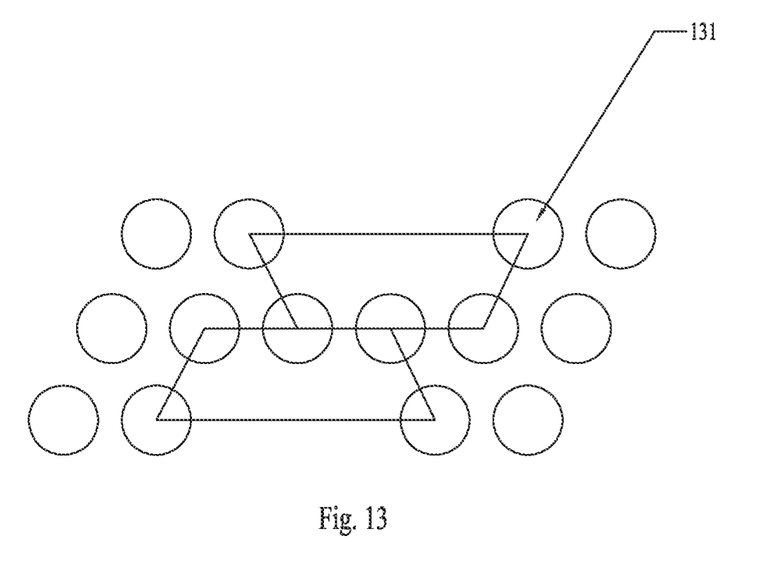
FIG. 13 is a schematic cross view of an arrangement of the battery cell assembly with 14 battery cells inside according to the present disclosure.
Figure 14:
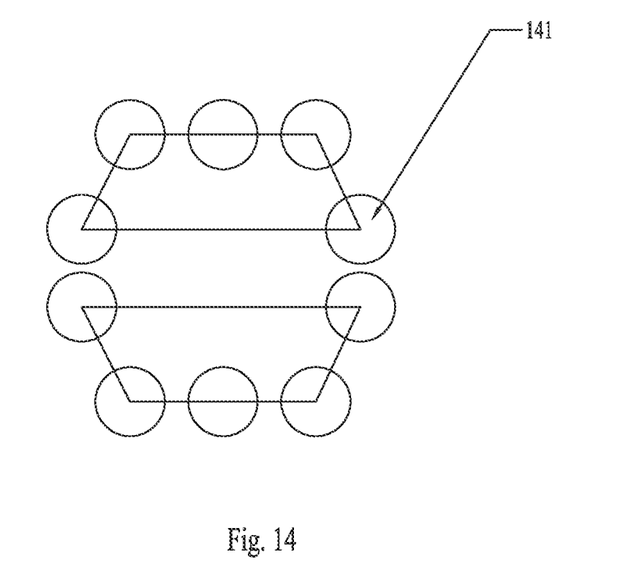
FIG. 14 is a schematic cross view of an arrangement of the battery cell assembly with 10 battery cells inside according to the present disclosure.

Referring to FIG. 11, even if each row of the battery cells is dislocated, some battery cell 111 will be completely surrounded by others.

Figure 9:
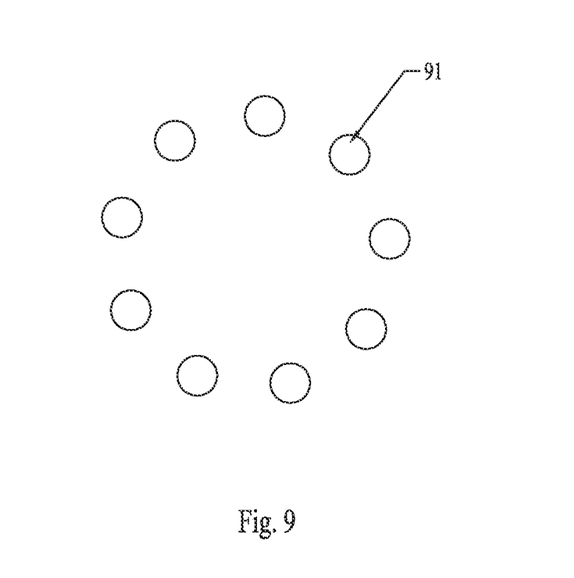
FIG. 9 is a schematic cross view of an existing arrangement of the battery cell assembly, wherein the battery cells are arranged along the circumference.

Certainly, referring to FIG. 9, the arrangement to disperse the battery cells 91 can solve the problem, but it will be difficult to design the battery housing of the battery pack and the fixed bracket, and it may be harder to use.

In the present disclosure, the battery cell assembly has at least one trapezoid portion, wherein a plurality of the battery cells 11 are arranged parallel, at least one trapezoid can be formed by the connection of the reference points of the cross sections of the plurality of battery cells successively. In this example, the trapezoid comprises a long baseline, a short baseline parallel to the long baseline, and two sidelines connecting the long baseline and the short baseline from two sides.

The long baseline is formed only by the connection of the reference points of the cross sections of the adjacent battery cells. The short baseline at least connects the reference points of the cross sections of at least two or more battery cells. The sideline at least connects the reference points of the cross sections of at least two or more battery cells.

For the clear explanation of the technical proposal of the present disclosure, the following interprets the concepts.

The trapezoid portion, as a part of the battery cell assembly 10, is a combination formed by a plurality of the battery cells 11. A combination can be considered as a trapezoid portion, if one trapezoid, as defined in the present disclosure, can be formed by the connection of the reference points of the cross sections of a plurality of battery cells. In addition, one battery cell 11 may belong to two different trapezoid, that is, a battery cell 11 can form different trapezoids with different battery cells 11 respectively.

The cross section shape of the battery cell 11 refers a planar shape formed by the outline of the battery cell 11 in a cross section perpendicular to the length of the battery cell 11. According to FIG. 5, (L) indicates the length direction of the battery cell 11, (S) indicates a cross section perpendicular to the length of the battery cell 11, and the shadow area indicates the cross section shape of the battery cell 11.

Figure 5:
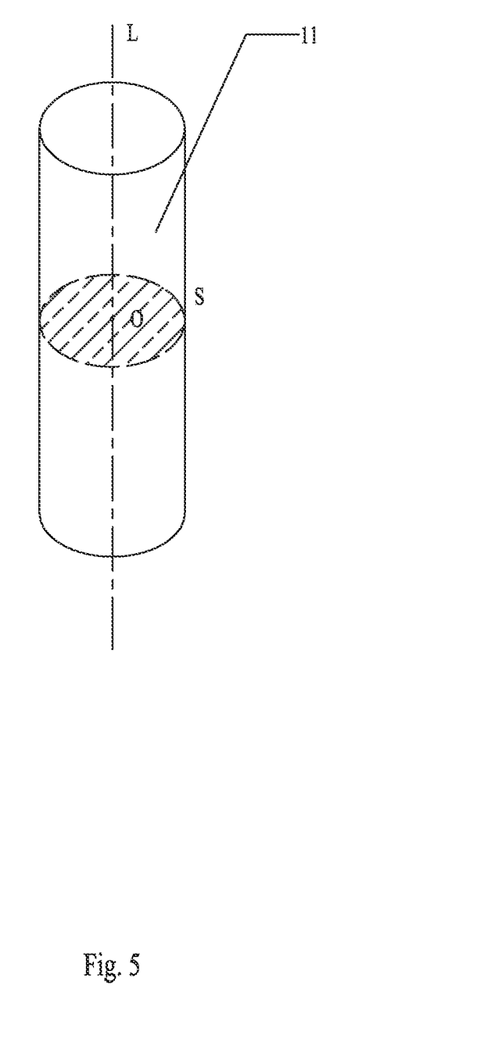
FIG. 5 is a schematic view illustrating the perspective structure of one battery cell in FIG. 4.

The reference point refers a connection point in the cross section shape of the battery cell 11, and it could be the geometrical centre (O) of the cross section shape of the battery cell 11 as shown in FIG. 5.

The reference points in the cross section shapes are disposed in the same relative position to the cross section shapes of battery cells 11.

The trapezoid, which is a 4-sided shape with only a pair of opposite sides parallel, formed by the connection of the reference points of the cross sections of the battery cells 11 successively.

The long baseline is the longer one of the sides parallel.
The short baseline is the shorter one of the sides parallel.
The sideline is any one of the two sidelines that are not parallel.

According to this scheme and FIG. 12-16, even if more than 9 battery cells 121 (or 131, 141, 151, 161) are arranged, there will be no battery cell 121 (or 131, 141, 151, 161) completely surrounded by others.

In the embodiment of FIG. 1, the battery pack 1 outputs a voltage of 56V, the battery cell assembly thereof comprises 28 battery cells 11, which are divided into two same groups 101 and 102, separately arranged along the length direction of the battery cell 11 in the scheme, with 14 battery cells per group.

Figure 8:
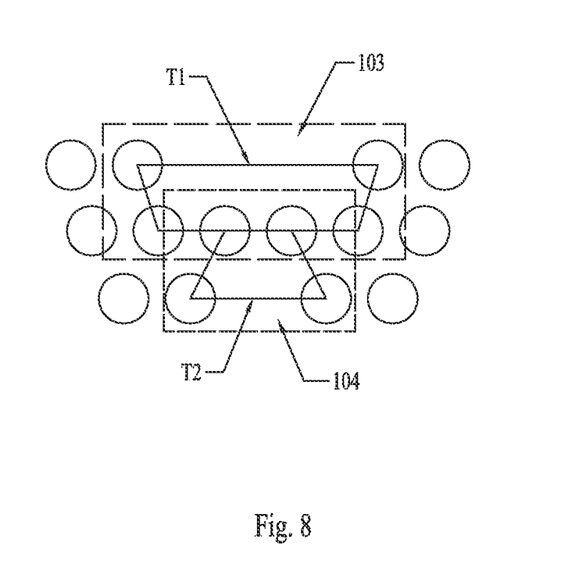
FIG. 8 is a schematic cross view of the battery cell assembly in FIG. 7.

14 battery cells in one group can be arranged according to FIG. 7-8. For instance, according to FIG. 7-8, the battery cells 11 are arranged into 3 rows, 4 in the first row, 6 in the second row, 4 in the third row. Taken as a whole, the distance between the battery cells in the two ends of the first row is the largest, that in the second row in the middle, and that in the third row smallest, forming a shape with a contraction trend from the first row to the third row.

In the arrangement, there are two trapezoid portions 103 and 104, formed by the battery cells 11 in the second row and the battery cells of the first and third rows at two sides.

The trapezoid portions 103 and 104 have only one trapezoid T1 and T2 respectively, that is, the sidelines of the trapezoid T1 and T2 connect two battery cells (the reference points of the cross sections of the battery cell 11, as a concise description, the following connection battery cell 11 means the same), the benefit is, the battery cell forming the baseline of the trapezoid T1 and T2 is closer to the external side and easy to dissipate heat.

Figure 16:
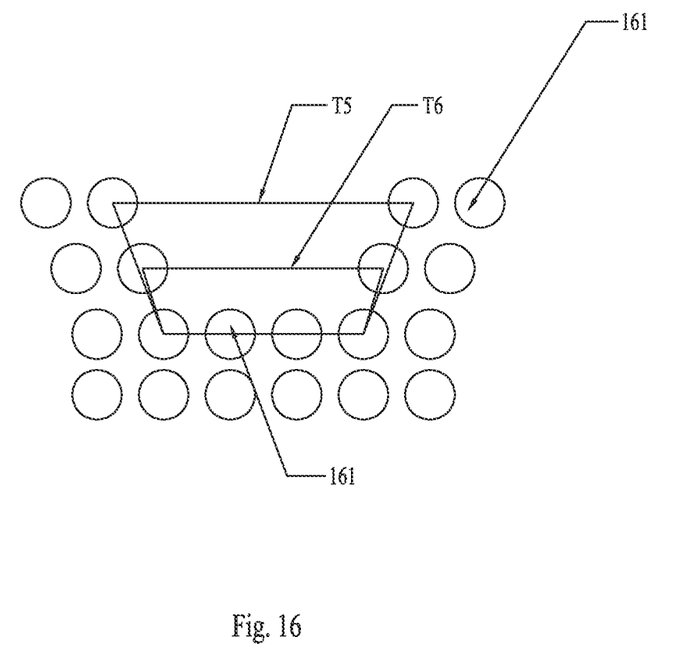
FIG. 16 is a schematic cross view of an arrangement of the battery cell assembly with 20 battery cells inside according to the present disclosure.

According to FIG. 16, when the battery cells connected as the baseline are too far from the edge, it is also difficult for the battery cell 161 on the baseline to dissipate heat.

Additionally, according to FIG. 16, when a trapezoid portion has more than one trapezoid, such as T5 and T6, the longest long baseline in the trapezoid portion should be arranged on the edge of the battery cell assembly.

Figure 15:
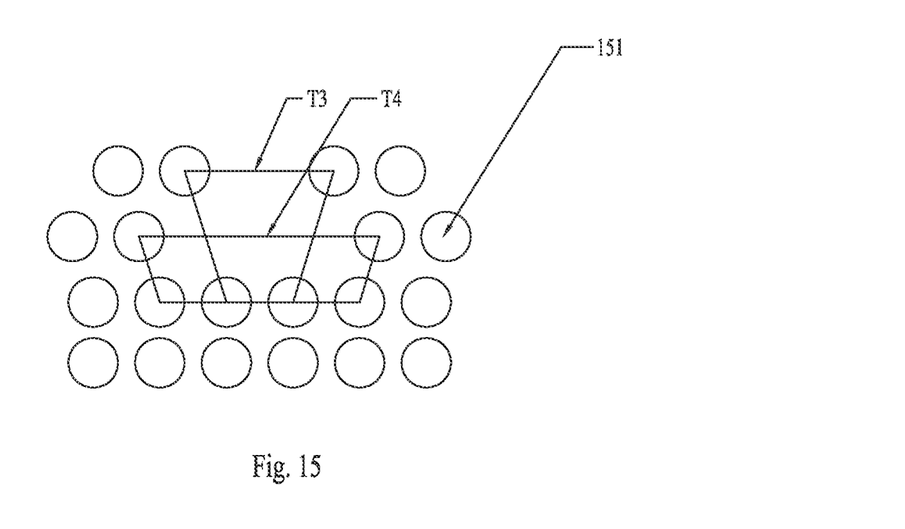
FIG. 15 is a schematic cross view of an arrangement of the battery cell assembly with 20 battery cells inside according to the present disclosure.

According to FIG. 15, the long baseline of the trapezoid T3 is shorter than that of the trapezoid T4, and therefore, the heat dissipation space of the battery cell 151 connected with the long baseline of the trapezoid T4 is reduced. For better heat dissipation, it should be arranged according to FIG. 16, the long baseline of the trapezoid T5 with the longest long baseline should be arranged on the edge, while the long baseline of a smaller trapezoid T6 should be arranged inside.

In other words, while forming the trapezoid portion, it is best to arrange the space between the battery cells, connected with the long baseline, to increase gradually from the inside to the outside.

Because of the above reasons, the scheme in FIG. 8 is formed. Additionally, in the scheme, there are two trapezoid portions 103 and 104, the long baseline in the trapezoid portion 103 is longer than that in the other trapezoid portion 104, and both the trapezoids T1 and T2 are isosceles trapezoids with the same symmetry axis, all the battery cells 11 are arranged mirror-symmetrically with each other with respect to the symmetry axis of the trapezoids in the cross section.

The benefit of a larger trapezoid T1 and a smaller trapezoid T2 is that, the integral shape formed by the battery cells 11 is suitable for holding, and the space formed by the larger trapezoid T1 can accommodate part of the integral formed by the circuit board 30 and the connection terminal 40.

It is generally easier to design and manufacture the battery housing 20 and the corresponding fixed bracket, with a symmetric design.

According to FIG. 1-8, in order to make the battery housing 20 suitable for the battery cell assembly 10 introduced above, the battery housing 20 has a first maximum projection plane A, the projected area of the battery housing 20 in the first maximum projection plane is larger than that in any other planes, and the first maximum projection plane is perpendicular to the cross section S of the battery cell 11, that is, the length direction M of the battery housing 20 (the length direction of the battery pack 1) is along the length direction L of the battery cell 11. According to FIG. 6, the battery cell assembly 10 has a second maximum projection plane B, the projected area of the battery cell assembly 10 in the second maximum projection plane is larger than that in any other planes, and the second maximum projection plane B of the battery cell assembly 10 is perpendicular to the cross section S of the battery cell 11. In one example, the first maximum projection plane A of the battery housing 20 is parallel to the second maximum projection plane B of the battery cell assembly 10, that is, the arrangement of the battery cell assembly 10 is parallel to the length direction M of the battery housing 20.

The circuit board 30 electrically connects the battery cell assembly 10, to control the charging or discharging of the battery cell 11. The connection terminal 40 is mounted on the circuit board 30, to form electric connection with a charger or an electric device, to charge the battery pack 1 with a charger or to provide electric energy to an appliance. The integral formed by the circuit board 30 and the connection terminal 40 is partially located between two battery cells 11 forming the long baseline 121 of the trapezoid portion 12, and more particularly, in the present embodiment, the connection terminal 40 in the integral formed by the circuit board 30 and the connection terminal 40, partially inserts into two battery cells 11 forming the long baseline 121; when the battery pack 1 is plugged into a charger or an appliance, the connection terminal 40 can easily make an electric connection with a charger or an appliance. In one example, the minimum distance between the connection terminal 40 and the outside surface of the battery housing 20 is greater than 7 mm, and therefore, safety requirements can be increased and the stable of the connection terminal 40 can be protected.

In order to arrange the battery pack 1 conveniently in a charger or an appliance, the battery housing 20 further comprises two installation guide rails 21 and has at least one housing groove 22, the connection terminal 40 is partially arranged between two installation guide rails 21. The installation guide rails 21 guide the battery pack 1 to connect to a charger or an appliance along the first direction perpendicular to the cross section S of the battery cell 11, in the present embodiment, the first direction is parallel to both the length direction M of the battery housing 20 and the length direction L of the cylindrical battery cell 11.

In particular, the installation guide rails 21 are formed by a guiding groove 211 extending along the first direction, the guiding groove is open in the front along the first direction, and closed in the rear thereof. The connection terminal 40 is closer to the rear of the guiding groove 21, along the first direction, and located between two guiding grooves 211. When the battery pack 1 is mounted on a charger or an appliance from the front to the rear, the connection terminal will not be electrically connected to the charger or the electric device until the rear is mounted, which further ensures the safety of the battery pack 1.

The housing groove 22 forms a hollow in the direction perpendicular to the first direction, and the length thereof is parallel to the length direction of the battery pack 1, to match the corresponding structure on a charger or an electric device. More particularly, the housing groove 22 is formed between two battery cells 11, forming the long baseline 121 of the trapezoid portion 12; and the housing groove 22 is arranged between two installation guide rails 21, that is, the two guiding grooves 211 matching two installation guide rails 21, which are arranged on two sides of the width direction of the housing groove 22; and the notches of the two guiding grooves 211 are arranged respectively, all facing to the side of the housing groove 22. In the plane parallel to the cross section S of the battery cell 11, the connection terminal 40 is partially located inside the housing groove 22 in the depth direction of the housing groove 22, therefore, it is convenient to make an electric connection to a charger or an appliance. More particularly, the housing groove 22 comprises a groove bottom 221 parallel to the first direction, wherein the groove bottom 221 has a plurality of heat dissipation holes 222, for heat dissipation of the battery cell assembly 10 inside the battery housing 20, to ensure the normal operation of the battery pack 1.

When the battery cell assembly 10 comprises two trapezoid portions 12, two housing grooves 22, 23 are formed on the corresponding battery housing 20, meanwhile, the wider housing groove 22 is arranged between two installation guide rails 21, and two installation guide rails 21 are arranged symmetrically to the housing groove 22, that is, the guiding groove 211 is formed on the two sides of the wider housing groove 22, the front of the housing groove 22 is opened, the rear is closed by arranging a stopping housing wall 223 on the rear thereof, the wall surface of the stopping housing wall 223 is perpendicular to the first direction, and the connection terminal 40 is formed inside the stopping housing wall 223; there is no installation guide rail 21 on the two sides of the other housing groove 23.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:
1. A battery pack comprising:
   a battery housing;
   a battery cell assembly arranged inside the battery housing, the battery cell assembly comprising:
      a trapezoid portion comprising a plurality of battery cells arranged in parallel, the trapezoid portions defines a trapezoid formed by the connection of the reference points of the cross sections of the battery cells successively, the trapezoid comprising:
         a long baseline;
         a short baseline parallel to the long baseline; and
         two sidelines connecting the long baseline and the short baseline from both sides respectively;
         wherein the long baseline is formed only by the connection of the reference points of the cross sections of two battery cells separated by a space;
         the short baseline at least connecting the reference points of the cross sections of at least two or more battery cells; and
         the sidelines at least connecting the reference points of the cross sections of at least two or more battery cells,
         wherein the long baseline of the trapezoid portion is located on an edge of the battery cell assembly; and
   a connection terminal operably coupled to the battery housing and the battery cell assembly to enable the battery cell assembly to output electric energy,
   the battery housing comprising:
      installation guide rails capable of guiding the battery pack to connect to a charger or an electrical appliance at least along a first direction perpendicular to the cross section of the battery cell;
      the battery housing having a housing groove at least formed between two battery cells which form the long baseline by the connection of the reference points of the cross sections thereof;
      wherein one of the installation guide rails is at least formed by a guiding groove 211 extending along the first direction, the guiding groove 211 being opened in the front along the first direction, and
      wherein the battery housing defines a first maximum projection plane (A), and the projected area of the battery housing in the first maximum projection plane (A) is larger than that in other planes, the cross section of the battery cell being perpendicular to the first maximum projection plane (A) of the battery housing, the battery cell assembly defining a second maximum projection plane (B), and the projected area of the battery cell assembly in the second maximum projection plane (B) being larger than that in other plane; the cross section of the battery cell being perpendicular to the second maximum projection plane (B) of the battery cell assembly; the first maximum projection plane (A) of the battery housing being parallel to the second maximum projection plane (B) of the battery cell assembly,
      wherein said battery cell assembly comprises a left unit body (122) and a right unit body (123) which are mirror-symmetrical, and a connecting unit body (124) provided there between, wherein said left unit body (122) and said right unit body (123) form mirror symmetry, and a symmetrical mirror surface is perpendicular to a maximum projection surface (A) of said battery cell assembly (12),
      wherein, if said maximum projection surface of said parallel battery cell assembly is regarded as being in the horizontal direction, said left unit body and right unit body go beyond the connecting unit body on both upper and lower sides and form two grooves (124a) and (124b) having different sizes on both sides of said connecting unit body, and
      wherein a distance of each of the connection terminals from an outer surface of the insert housing wall is greater than or equal to 7 mm.

2. The battery pack according to claim 1, wherein the trapezoid portion defines only one trapezoid.

3. The battery pack according to claim 2, wherein the battery cell assembly comprises two trapezoid portions, and the longest long baseline in one of the trapezoid portions is longer than the longest long baseline in the other trapezoid portion.

4. The battery pack according to claim 3, wherein the short baselines of the two trapezoid portions coincide in the same line.

5. The battery pack according to claim 4, wherein the battery cell is a cylindrical lithium battery.

6. The battery pack according to claim 5, wherein the trapezoids are all isosceles trapezoids.

7. The battery pack according to claim 6, wherein the battery cells in the battery cell assembly are arranged mirror-symmetrically with respect to the symmetry axis of the trapezoid.

8. The battery pack according to claim 1, wherein the battery housing comprises:
   installation guide rails to guide the battery pack to connect to at least one of a charger or an electrical appliance at least along a first direction perpendicular to the cross section of the battery cell.

9. The battery pack according to claim 8, wherein the battery pack further comprises a connection terminal to enable the battery cell to output electric energy and two installation guide rails, wherein the connection terminal is at least partially arranged between the two installation guide rails.

10. The battery pack according to claim 1, wherein the battery housing comprises installation guide rails to guide the battery pack to connect to at least one of a charger or an electrical appliance at least along a first direction perpendicular to the cross section of the battery cell, and wherein the battery defines a housing groove at least formed between two battery cells which form the long baseline by the connection of the reference points of the cross sections thereof.

11. The battery pack according to claim 10, wherein the installation guide rails include two installation guide rails, and at least one housing groove is arranged between the two installation guide rails.

12. The battery pack according to claim 10, wherein the battery pack further comprises a connection terminal to enable the battery cell to output electric energy, the connection terminal being at least partially arranged inside the housing groove, in a plane parallel to the cross section of the battery cell.

13. The battery pack according to claim 10, wherein the housing groove is provided with a heat dissipation hole, the housing groove comprising a groove bottom surface parallel to the first direction on which the ventilation hole is arranged.

14. The battery pack according to claim 1, wherein the connection terminal is located proximate to the rear of the guiding groove along the first direction.

15. The battery pack according to claim 14, wherein the battery housing defines two guiding grooves, at least one of the housing grooves being arranged between the two guiding grooves, and the notches of the guiding grooves all face to the side of the housing groove.

16. The battery pack according to claim 1, wherein the battery pack further comprises a connection terminal to enable the battery cell to output electric energy, the battery housing comprising:

two installation guide rails configured to guide the battery pack to connect to at least one of a charger or an electrical appliance at least along the first direction perpendicular to the cross section of the battery cell;

a stopping housing wall with at least part of the wall surface thereof perpendicular to the first direction;

the battery housing having a housing groove at least formed between two battery cells which form the long baseline by the connection of the reference points of the cross sections thereof;

wherein the front of the housing groove having the largest width is opened, and the stopping housing wall is arranged in the rear of the housing groove, the connection terminal being arranged inside the stopping housing wall.

17. The battery pack according to claim 16, wherein at least one housing groove is arranged between two installation guide rails which are symmetrically arranged with respect to the housing groove.

* * * * *

UNITED STATES PATENT AND TRADEMARK OFFICE
CERTIFICATE OF CORRECTION

PATENT NO. : 10,103,365 B2
APPLICATION NO. : 14/583320
DATED : October 16, 2018
INVENTOR(S) : Yuexiang Zhang, Xiaohong Lin and Tianshi Yuan It is certified that error appears in the above-identified patent and that said Letters Patent is hereby corrected as shown below:

In the Claims

In Claim 1, Column 10:
Lines 2, 3, 22, 24, 25, and 28, each occurrence of the reference numerals "211", "(122)", "(123)", "(124)" and "(12)" is deleted; and
Line 34, the phrase "(124a) and (124b)" is deleted.

Signed and Sealed this
Third Day of October, 2023

Katherine Kelly Vidal
*Director of the United States Patent and Trademark Office*